(12) United States Patent
Gabryjelski et al.

(10) Patent No.: US 11,514,885 B2
(45) Date of Patent: Nov. 29, 2022

(54) AUTOMATIC DUBBING METHOD AND APPARATUS

(71) Applicant: Microsoft Technology Licensing, LLC, Redmond, WA (US)

(72) Inventors: Henry Gabryjelski, Redmond, WA (US); Jian Luan, Beijing (CN); Dapeng Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/342,416

(22) PCT Filed: Nov. 21, 2016

(86) PCT No.: PCT/CN2016/106554
§ 371 (c)(1),
(2) Date: Apr. 16, 2019

(87) PCT Pub. No.: WO2018/090356
PCT Pub. Date: May 24, 2018

(65) Prior Publication Data
US 2020/0058289 A1    Feb. 20, 2020

(51) Int. Cl.
*G10L 13/00* (2006.01)
*G06F 40/58* (2020.01)
(Continued)

(52) U.S. Cl.
CPC .............. *G10L 13/00* (2013.01); *G06F 40/58* (2020.01); *G10L 13/086* (2013.01); *G10L 17/00* (2013.01)

(58) Field of Classification Search
CPC ....... G10L 15/30; G10L 15/22; G10L 13/033; G10L 13/08; G10L 2015/088;
(Continued)

(56) References Cited

U.S. PATENT DOCUMENTS 8,494,856 B2   7/2013   Latorre et al.
8,571,849 B2   10/2013  Bangalore et al.
(Continued)

FOREIGN PATENT DOCUMENTS

CN   1774715 A      5/2006
CN   101189657 A    5/2008
(Continued)

OTHER PUBLICATIONS

"Extended European Search Report Issued in European Patent Application No. 16921753.6", dated Mar. 26, 2020, 7 Pages.
(Continued)

*Primary Examiner* — Michael N Opsasnick
(74) *Attorney, Agent, or Firm* — Schwegman Lundberg & Woessner, P.A.

(57) ABSTRACT

An automatic dubbing method is disclosed. The method comprises: extracting speeches of a voice from an audio portion of a media content (504); obtaining a voice print model for the extracted speeches of the voice (506); processing the extracted speeches by utilizing the voice print model to generate replacement speeches (508); and replacing the extracted speeches of the voice with the generated replacement speeches in the audio portion of the media content (510).

20 Claims, 6 Drawing Sheets

(51) Int. Cl.
*G10L 13/08* (2013.01)
*G10L 17/00* (2013.01)

(58) Field of Classification Search
CPC ......... G10L 2015/223; G10L 2015/228; G10L 15/08; H04W 4/80; G06F 16/3343; G06F 16/3329; G06F 3/167
See application file for complete search history.

(56) References Cited

U.S. PATENT DOCUMENTS

| | | | |
|---|---|---|---|
| 9,094,576 B1* | 7/2015 | Karakotsios | H04N 7/157 |
| 2003/0028380 A1* | 2/2003 | Freeland | G10L 13/00 |
| | | | 704/260 |
| 2007/0179779 A1* | 8/2007 | Kagoshima | G06F 40/42 |
| | | | 704/10 |
| 2007/0213987 A1 | 9/2007 | Turk et al. | |
| 2008/0195386 A1* | 8/2008 | Proidl | G10L 13/033 |
| | | | 704/235 |
| 2008/0255824 A1* | 10/2008 | Aso | G06F 40/289 |
| | | | 704/235 |
| 2008/0312926 A1 | 12/2008 | Vair et al. | |
| 2009/0037179 A1* | 2/2009 | Liu | G10L 13/08 |
| | | | 704/260 |
| 2009/0135176 A1* | 5/2009 | Snoddy | G06Q 30/0247 |
| | | | 345/419 |
| 2009/0135177 A1* | 5/2009 | Strietzel | G06T 13/40 |
| | | | 704/E15.005 |
| 2009/0204395 A1* | 8/2009 | Kato | G10L 13/033 |
| | | | 704/E11.001 |
| 2010/0036653 A1* | 2/2010 | Kim | G06F 40/58 |
| | | | 704/3 |
| 2010/0057435 A1 | 3/2010 | Kent et al. | |
| 2012/0069974 A1* | 3/2012 | Zhu | G10L 13/00 |
| | | | 379/88.14 |
| 2012/0316876 A1* | 12/2012 | Jang | H04N 21/4415 |
| | | | 704/246 |
| 2012/0323581 A1 | 12/2012 | Strietzel et al. | |
| 2013/0142341 A1* | 6/2013 | Del Galdo | G10L 19/008 |
| | | | 381/23 |
| 2013/0195428 A1 | 8/2013 | Marks et al. | |
| 2014/0040946 A1* | 2/2014 | Gates, III | H04N 21/2668 |
| | | | 725/34 |
| 2014/0100849 A1 | 4/2014 | Rasmussen | |
| 2014/0303958 A1 | 10/2014 | Lee et al. | |
| 2015/0227510 A1 | 8/2015 | Shin et al. | |
| 2016/0021334 A1 | 1/2016 | Rossano et al. | |
| 2016/0042766 A1 | 2/2016 | Kummer | |
| 2016/0203827 A1* | 7/2016 | Leff | G06T 13/40 |
| | | | 704/207 |
| 2017/0323633 A1* | 11/2017 | Lawrenson | G10L 25/90 |
| 2018/0011843 A1* | 1/2018 | Lee | G06F 40/51 |
| 2018/0247624 A1* | 8/2018 | Elkins | G10H 1/18 |

FOREIGN PATENT DOCUMENTS

| | | |
|---|---|---|
| CN | 101359473 A | 2/2009 |
| CN | 102404278 A | 4/2012 |
| CN | 103117057 A | 5/2013 |
| CN | 103838714 A | 6/2014 |
| WO | 2004090746 A1 | 10/2004 |
| WO | 2006082287 A1 | 8/2006 |
| WO | 2006129247 A1 | 12/2006 |

OTHER PUBLICATIONS

"Software Translates Your Voice into Another Language", Published in Technology Review, Mar. 9, 2012, 4 Pages.

"What is Melodyne?", Retrieved From: https://www.celemony.com/en/melodyne/what-is-melodyne, May 28, 2016, 11 Pages.

Misra, et al., "TAPESTREA: Techniques and Paradigms for Expressive Synthesis, Transformation, and Rendering of Environmental Audio (also known as taps)", Retrieved From: http://taps.cs.princeton.edu/, 2004, 2 Pages.

"International Search Report and Written Opinion Issued in PCT Application No. PCT/CN16/106554", dated Aug. 3, 2017, 13 Pages.

"Office Action issued in European Patent Application No. 16921753.6", dated Feb. 23, 2021, 6 Pages.

"Summons to Attend Oral Proceedings Issued in European Patent Application No. 16921753.6", dated Jan. 21, 2022, 7 Pages.

"Office Action Issued in Indian Patent Application No. 201917017767", dated Aug. 9, 2021, 6 Pages.

* cited by examiner

AUTOMATIC DUBBING METHOD AND APPARATUS

CROSS-REFERENCE TO RELATED APPLICATIONS

This application is a U.S. National Stage Filing under 35 U.S.C. 371 of International Patent Application Serial No. PCT/CN2016/106554, filed Nov. 21, 2016, and published as WO 2018/090356 A1 on May 24, 2018, which application and publication are incorporated herein by reference in their entirety.

BACKGROUND

Nowadays there are huge amount of media contents appearing in various kinds of media. For example, movies embodied in DVDs or Blu-ray Disc may be released in specific countries, huge amount of video/audio contents are provided by the content provider on Internet. Audio dubbing sometimes may be desired for users in order for a better experience when watching/listening the video/audio contents.

In order to provide various versions of audio for specific media content, dubbing actors are hired to read different versions of scripts. This traditional dubbing process is very costly and time consuming, and thus can only be used for some media content having a high budget, and is not possible to provide dubbing for most of the media content which are rapidly updated nowadays.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

According to an embodiment of the subject matter described herein, an automatic dubbing method comprises: extracting speeches of a voice from an audio portion of a media content; obtaining a voice print model for the extracted speeches of the voice; processing the extracted speeches by utilizing the voice print model to generate replacement speeches; and replacing the extracted speeches of the voice with the generated replacement speeches in the audio portion of the media content.

According to an embodiment of the subject matter, an automatic dubbing apparatus comprises: a speech extracting module configured to extract speeches of a voice from an audio portion of a media content; a voice print model obtaining module configured to obtain a voice print model for the extracted speeches of the voice; and a speech processing module configured to process the extracted speeches by utilizing the voice print model to generate replacement speeches, and replace the extracted speeches of the voice with the generated replacement speeches in the audio portion of the media content.

According to an embodiment of the subject matter, a computer system, comprises: one or more processors; and a memory storing computer-executable instructions that, when executed, cause the one or more processors to: extract speeches of a voice from an audio portion of a media content; obtain a voice print model for the extracted speeches of the voice; process the extracted speeches by utilizing the voice print model to generate replacement speeches; and replace the extracted speeches of the voice with the generated replacement speeches in the audio portion of the media content.

According to an embodiment of the subject matter, a non-transitory computer-readable medium having instructions thereon, the instructions comprises: code for extracting speeches of a voice from an audio portion of a media content; code for obtaining a voice print model for the extracted speeches of the voice; code for processing the extracted speeches by utilizing the voice print model to generate replacement speeches; and code for replacing the extracted speeches of the voice with the generated replacement speeches in the audio portion of the media content.

BRIEF DESCRIPTION OF THE DRAWINGS

Various aspects, features and advantages of the subject matter will be more apparent from the detailed description set forth below when taken in conjunction with the drawings, in which use of the same reference number in different figures indicates similar or identical items.

DETAILED DESCRIPTION

The subject matter described herein will now be discussed with reference to example embodiments. It should be understood these embodiments are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to". The term "based on" is to be read as "based at least in part on". The terms "one embodiment" and "an embodiment" are to be read as "at least one implementation". The term "another embodiment" is to be read as "at least one other embodiment". The term "a" or "an" is to be read as "at least one". The terms "first", "second", and the like may refer to different or same objects. Other definitions, explicit and implicit, may be included below. A definition of a term is consistent throughout the description unless the context clearly indicates otherwise.

Figure 1:
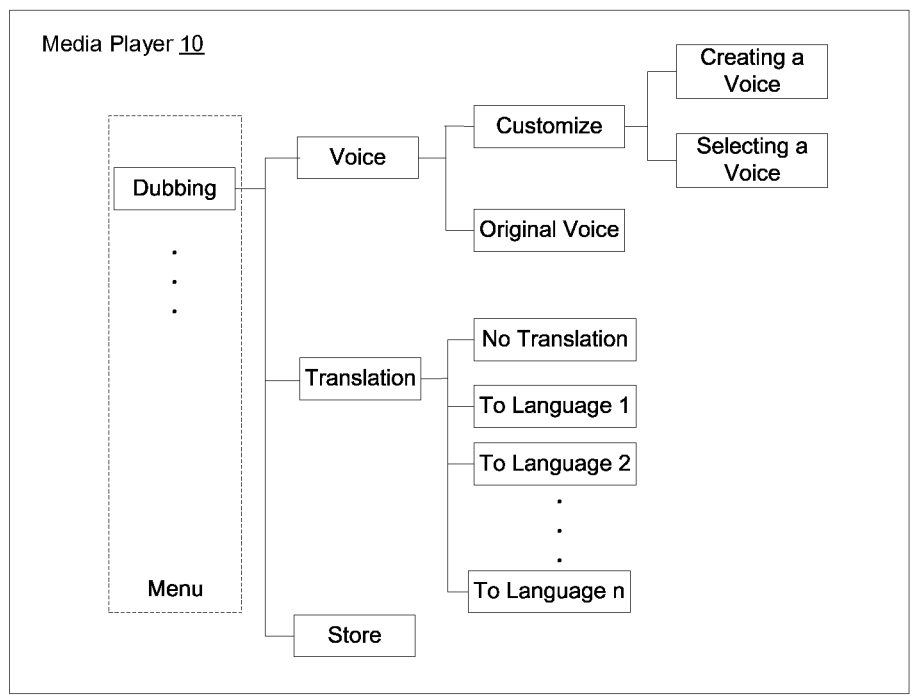
FIG. 1 illustrates a block diagram of an exemplary environment where embodiments of the subject matter described herein may be implemented.

FIG. 1 illustrates an exemplary environment 10 where embodiments of the subject matter described herein can be implemented. It is to be appreciated that the structure and functionality of the environment 10 are described only for the purpose of illustration without suggesting any limitations as to the scope of the subject matter described herein. The subject matter described herein can be embodied with a different structure or functionality.

The exemplary environment 10 is shown as a media player 10 which may be used to play back video or audio content. The media player 10 may be implemented on a client device, on a website, on a DVD player, and so on. The client device may be a mobile phone, a Personal Digital Assistant (PDA), a laptop, a desk computer, a tablet, or the like. The website may be a video/audio content providing website, on which the media player is provided. Alternatively, the media player may be provided by the video/audio content provider and may be installed on the client device. The media player 10 may also be a video game application, which may be implemented on a client device, a game providing website, a game play station and so on. It should be appreciated that the subject matter is not limited to any specific format of media player, and is not limited to a media player.

The media player 10 may include a user interface for interacting with a user. For example, the media player 10 may include a display window for displaying the played video, may include a volume bar for adjusting the volume of the played audio, and may include various menu items. For sake of simplicity, only the menu items related to dubbing are shown in FIG. 1, and the display window, the volume bar and other possible components are not shown in the FIG. 1.

As shown in FIG. 1, a menu item named "Dubbing" is provided in the interface of the media player 10. In an exemplary implementation, when a user intends to play back a media content such as a movie, a video clip, a music, a game, and so on, the user is allowed to utilize the dubbing function provided in the media player 10.

As shown in FIG. 1, the dubbing item may be branched into items named "Voice", "Translation", "Store". The "Voice" item may be further branched into items named "Customized", "Original Voice". The "Customize" may be further branched into items named "Creating a Voice", "Selecting a Voice". The "Translation" item may be further branched into items named "No Translation", "To Language 1", "To Language 2" . . . "To Language n", here the languages 1, 2 . . . n refers to languages which are different from the language in which the audio portion of the media content is made. For example, the original language may be English, and the languages 1, 2 . . . n may be Chinese, French, Japanese and so on. Although a certain number of menu items are shown in FIG. 1, it should be appreciated that there may be more or less menu items in the media player, the names of the items may be different, and the subject matter is not limited to a specific number of items or specific names of items.

A user may intend to play back a media content on the media player 10. For example, the user may intend to watch a film or playing a video game on the media player.

In an implementation scenario, the user is allowed to customize a voice for a character such as the protagonist in the film or game. When the menu item "Customize" is chosen or clicked, a customized voice may be created or selected to replace the original voice of the character. For example, when the menu item "Creating a Voice" is clicked, a dialog box may appear in order to create a voice print model for the user. For example, the user may be prompted to speak out a number of sentences provided in the dialog box, and a sound sensor such as a microphone or a microphone array may capture the speeches of the user. A voice print model of the user may be created based on the captured speeches of the user. The voice print model of the user may be used to generate the user's voice, which is used to replace the original voice of the character.

Figure 1A:
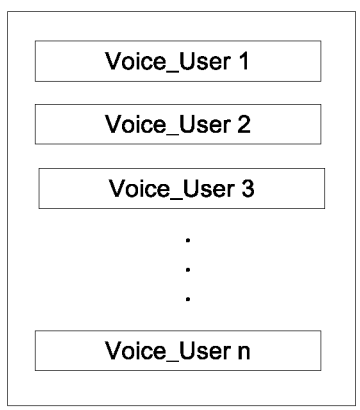
FIGS. 1A to 1C illustrate exemplary databases in which predefined voice print models are stored according to embodiments of the subject matter.
Figure 1B:
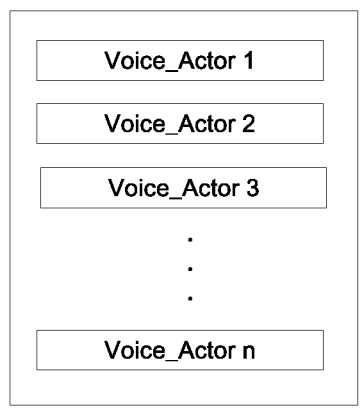
Figure 1C:
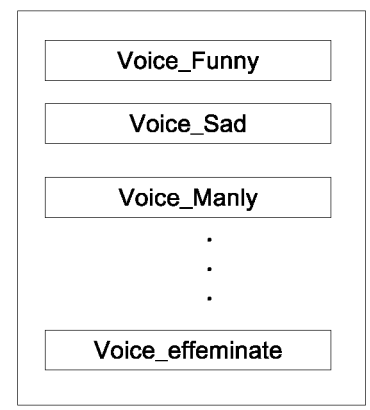

When the menu item "Selecting a Voice" is clicked, the user may be allowed to choose a voice print from one or more predefined voice print models. The selected voice print model may be used to generate a customized voice, which is used to replace the original voice of the character. A number of predefined voice print models may be provided in a database. For example, as shown in FIG. 1A, voice print models which are created for users as mentioned above may be provided in a database. As shown in FIG. 1B, voice print models of a number of actors such as those famous actors may be predefined and provided in a database. As shown in FIG. 1C, voice print models of different temperaments or emotions may be predefined and provided in a database. It should be appreciated that other kinds of voice print models may be provided in a database, and different kinds of voice print models may be provided in a single database or separate databases respectively.

In an implementation scenario, when the menu item "Original Voice" is chosen or clicked, no customized voice is used to perform the dubbing, in other words, a character's own voice in the original audio is used to perform the dubbing.

In an implementation scenario, when the menu item "No Translation" is chosen, no translation would be performed in the dubbing process. For example, when both the "Creating a Voice" item and the "No translation" item are chosen, an original voice of a character in the original language may be replaced with the user's voice in the original language. When the "Selecting a Voice" item and the "To Language 1" item are chosen, an original voice of a character in the original language may be replaced with the selected voice in the language 1 which is different from the original language. When the "Original Voice" item and the "To Language n" item are chosen, an original voice of a character in the original language may be replaced with the character's own voice in the language n which is different from the original language.

In an implementation, when the menu item "store" is chosen, the dubbing resulted audio portion of the media content may be stored, therefore the stored audio may be played back directly when the media content is played back repetitively later.

It should be appreciated that it's not necessary to implement all the functions denoted by the menu items in a single device or application, and any suitable combination of part of the functions may be implemented in a device or application. For example, the Customize function may be individually implemented in a device or application for providing the customized dubbing function. As another example, the translation function with the actor's own voice may be individually implemented to provide automatic cross-language dubbing.

Figure 2:
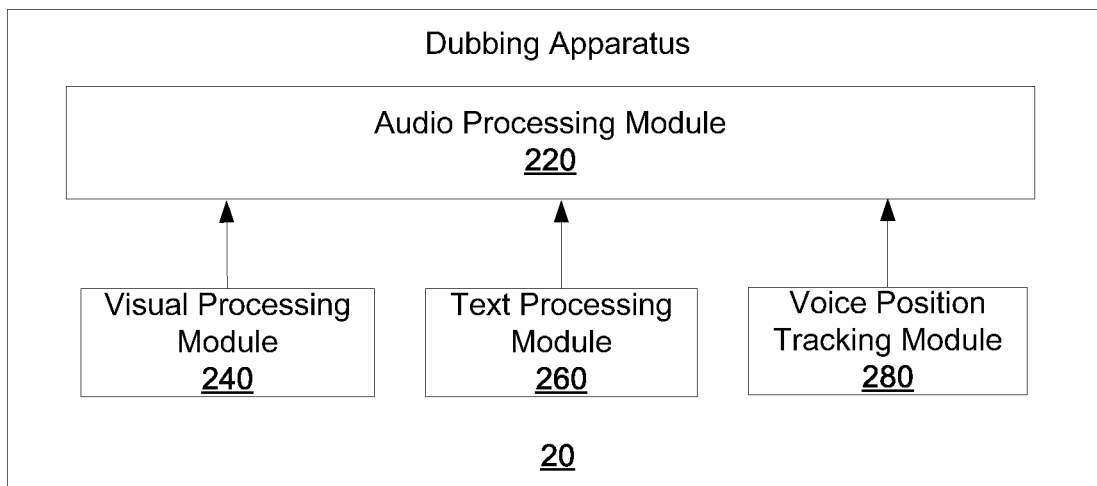
FIG. 2 illustrates a block diagram of an apparatus for performing automatic dubbing for a media content according to an embodiment of the subject matter.

FIG. 2 illustrates an apparatus or application for performing automatic dubbing for a media content according to an embodiment of the subject matter.

The dubbing apparatus 20 may include an audio processing module 220 which is to process the audio portion of the media content to obtain a dubbed audio of the media content. In an implementation, the audio processing module 220 may extract speeches of a voice from an audio portion of the media content, obtain a voice print model to be used for the extracted speeches of the voice, process the extracted speeches by utilizing the voice print model to generate replacement speeches, and replace the extracted speeches of the voice with the generated replacement speeches in the audio portion of the media content.

The dubbing apparatus 20 may further include a visual processing module 240, a text processing module 260, and a voice position tracking module 280. The visual processing module 240 may perform visual analysis such as speaker recognition, scene transition detection and so on. The text processing module 260 may perform text analysis such as text format analysis, text content analysis and so on. The voice position tracking module 280 may track the voice position of the audio. Any of resulted data from the visual processing module 240, text processing module 260, and voice position tracking module 280 may be used by the audio processing module 220 to enhance the dubbing process. It should be appreciated that it's not necessary to implement all the modules in a single apparatus, reasonable combinations of the modules would be apparent for those skilled in the art.

Figure 3:
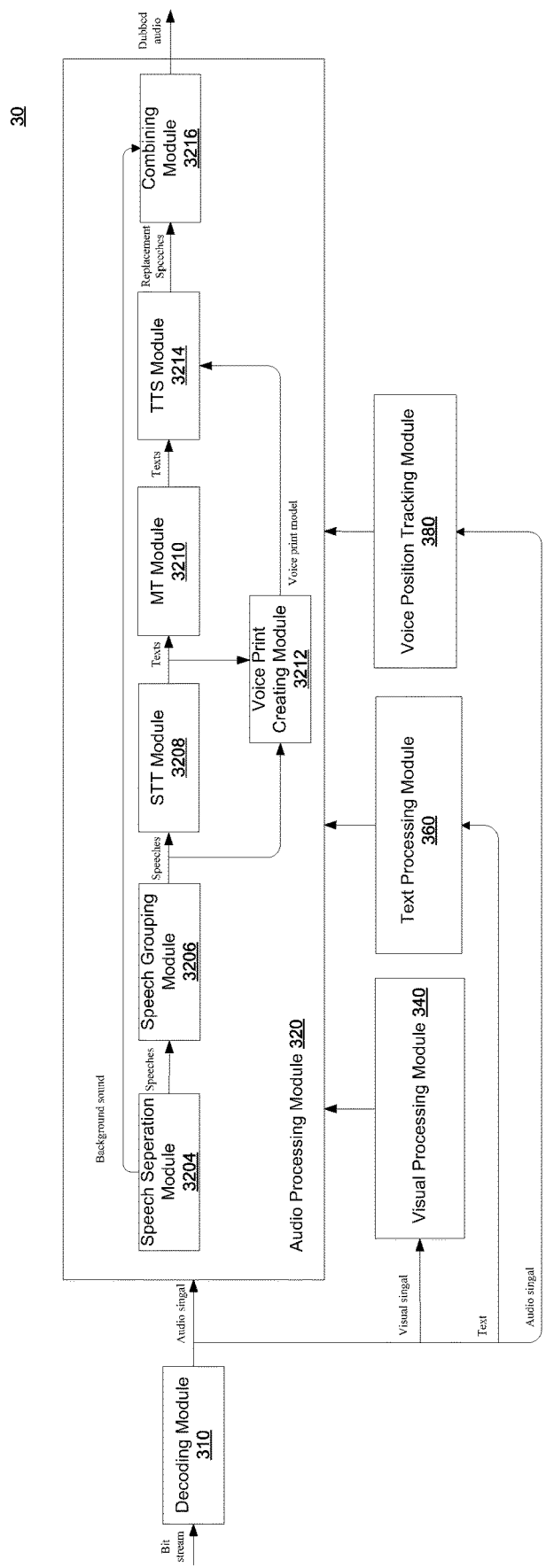
FIG. 3 illustrates a block diagram of an apparatus for performing automatic dubbing for a media content according to an embodiment of the subject matter.

FIG. 3 illustrates a detailed structure of an apparatus for performing automatic dubbing for a media content according to an embodiment of the subject matter.

Examples of a media content may include a movie, a television program, a video clip, a video game, or any other recorded media content. The media content may be in digital format and usually include an audio portion, a visual portion and metadata. The metadata may provide location information of the audio portion and the visual portion in order to allow the both to be synchronized. The metadata may also include codec information such as the coding format and related coding information of the media content. The metadata may also provide general descriptive information for the media content. For example, the metadata may include information such as a title, closed captions, subtitles, lyrics, transcripts, actor information, rating information, reviews and so on.

The media content is usually encoded in a standard format, such as Moving Picture Experts Group (MPEG), Audio Video Interleaved (AVI), Advanced Streaming format (ASF), Windows Media Video (WMV), H.26x, and so on. The audio encoded in the media content may support mono-channel and/or multi-channel. The multi-channel audio may provide a surround sound, and examples of multi-channel audio formats include DOLBY LABORATORIES codecs such as Dolby Digital (commonly referred to as AC-3), Dolby Digital EX, Dolby Digital Surround EX, Dolby Digital Live, Dolby Digital Plus, and Dolby TrueHD. Additional examples of multi-channel audio formats include DEDICATED TO SOUND (DTS, previously DIGITAL THEATER SYSTEMS, INC.) codecs such as DTS Coherent Acoustics (commonly referred to by consumers as simply DTS), DTS-ES, DTS 96/24, DTS-HD High Resolution Audio, and DTS-HD Master Audio. Additional examples of multi-channel audio formats include Windows Media Audio Professional, and so on. Some audio formats have recently included the concept of audio objects, which may be considered a specialization of an audio channel. In some cases, the audio objects provide additional metadata, such as a dynamic position of the audio object. For example, DTS:X and Dolby Atmos audio formats provide multi-channel audio plus additional audio objects. A bit stream of the media content may be decoded by the decoding module 310 to obtain the audio portion, the visual portion and the metadata, which may also be referred to as audio signal, visual signal and metadata. It should be appreciated that the audio signal output from the decoding module 310 may be the individual decoded audio, which may be accompanied with optional additional metadata, such as channel position data and so on, and the audio signal output from the decoding module 310 may also be the original encoded audio, which may be further decoded to obtain the decoded audio and the optional metadata. For sake of simplicity, we assume that the detection module 310 may perform the video decoding and audio decoding altogether.

The audio signal may be processed at the speech separation module 3204 to obtain speeches from the audio signal.

In an implementation, at the speech separation module 3204, the audio signal may be detected by using a speech activity detection (SAD) process. For a mono audio, the SAD process may be performed on the audio signal of the single channel to recognize the human speeches. For a surround audio, the SAD process may be performed on the audio signal of each of the multiple channels to recognize the human speeches. Sometimes all speeches are included in one channel such as the center channel of the surround audio while other sounds are included in the other channel or channels. If this information may be obtained from the metadata, the clean speeches may be directly obtained from this channel without processing other channels.

In an implementation, the media content may include different audio versions in different languages. In this case, the different audio versions may be utilized to obtain cleaner speeches separated from background sound.

As an example, there is an audio version in a first language such as English and an audio version in a second language such as French. Usually the background sounds of the two audio versions are substantially same while the speeches of the both are different and actually rarely overlapped to each other in time domain and/or frequency domain. By utilizing this fact, a subtracting operation between the two audio versions may effective eliminate the background sound. For example, if the English speeches are desired, for an audio channel or track, the French audio version may be subtracted from the English audio version. In this way, the background sound may be eliminated and the French speeches may be inverted, then the English speeches may be obtained by omitting the inverted signal. On the other hand, background sound may be obtained by subtracting the detected speeches from the original audio track.

As an example, different audio versions in different languages may be averaged to obtain an enhanced separation result. A plurality of N audio tracks of different language versions may be averaged to result in a common background noise, with each version (including the corresponding language's speech) remaining 1/N power in the average audio track. An example of N may be 3. The averaged audio track may be subtracted from a target audio track containing the desired speeches. The first result would be the speeches from the target audio track with (N−1)/N power and N−1 inverted alternate speeches from the other N−1 audio tracks in different languages with 1/N power. Then the desired speeches may be separated out. On the other hand, the above first result may be processed to get a "noise profile". For example, an existing tool Audacity provides a function Get Noise Profile that may be used to get the noise profile of the first result. Then the noise profile of the first result may be applied to the target audio track to eliminate the speeches and obtain the background sound with a better quality.

In an implementation, different channels of a surround sound audio may be utilized to provide enhanced speech separation. Taking two audio channels as an example, usually the two channels may include same speeches but different background sound. By subtracting the audio signal of a first channel from that of a second channel, the speech may be substantially eliminated in the resulted audio signal, the background sound of the second channel may be substantially remained, and the background sound of the first channel may be substantially reverted. In this way, the background sound of the second channel may be obtained by eliminating the inverted signal. The background sound of the first channel may be obtained by eliminating the positive signal and inverting the inverted signal. On the other hand, the speeches may be obtained from the audio signal by subtracting the separated background signal. This implementation may obtain a clean separation for center-paned speeches, which means the speeches are center positioned between the two channels.

The pan data or positional data may be pre-encoded in the audio portion or may be included in the metadata. If the positional data indicates that the speeches are not center positioned between the two channels, the positional data may be used to adjust the audio track to obtain center positioned speeches. For example, for an audio track with varying positional data, the positional data may be inverted with respect to the center position, that is, if the center position value is 0, a positive positional value is changed to a negative value and a negative positional value is changed to a positive value. The audio track is adjusted by utilizing the reversed positional data to obtain a mirror audio track, then the audio track and the mirror audio track are mixed and the resulted track would have the center positioned speeches. Then the resulted track may be used to separate the speeches and the background sound by using the above mentioned subtracting method.

Figure 4:
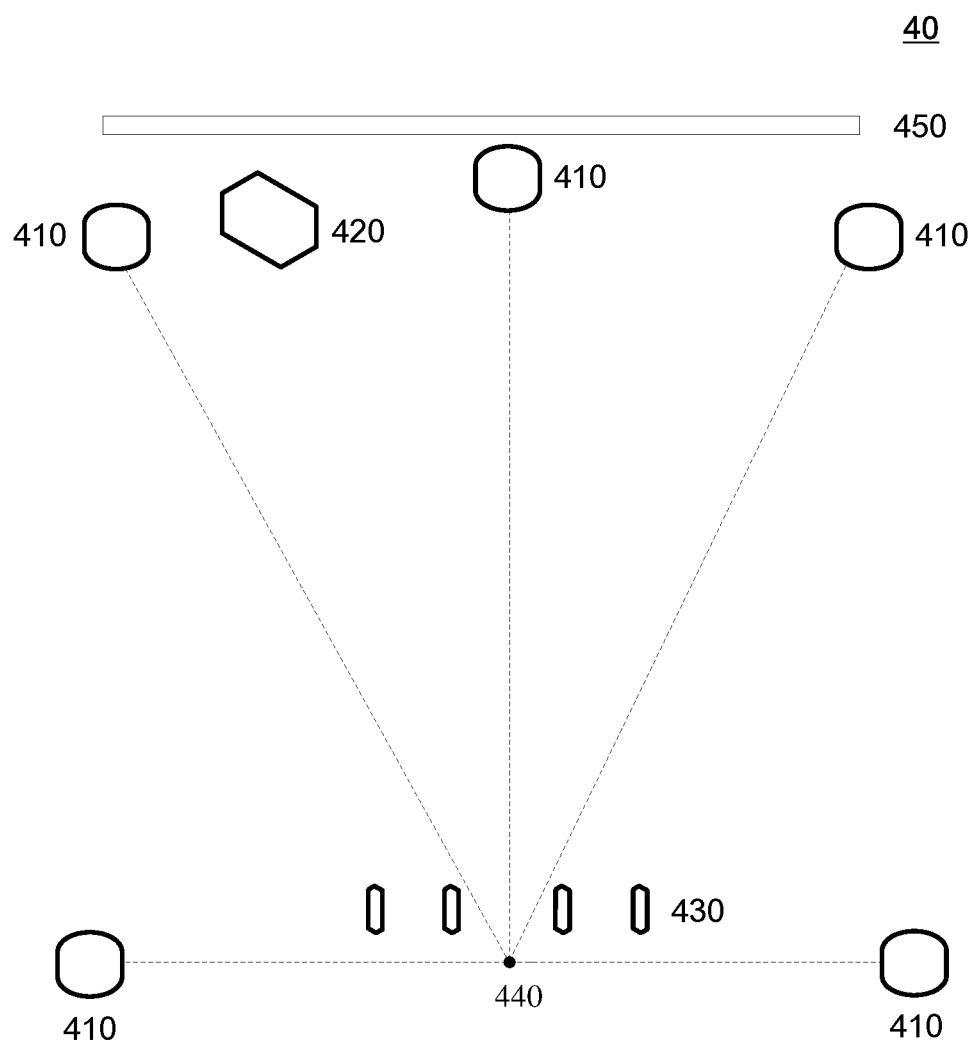
FIG. 4 illustrates a schematic diagram of a reference configuration of speakers for a surrounding sound system according to an embodiment of the subject matter.

In an implementation, the audio positional data may be calculated for the surrounding sound audio at the voice position tracking module 380. Directional sensitivity using a microphone array is a known technology, in which the direction of a voice may be determined by using an array of microphones. The typical surround audio formats such as Dolby and DTS each have predefined, for a reference implementation, a location (angle, height, etc.) for each channel's speaker, where the walls for reflections would be, and a primary sweet spot for a listener. An example of such reference implementation 40 for 5.1 audio is illustrated in FIG. 4. In the reference implementation 40, speakers 410 and a woofer 420 are deployed with respect to a display screen 450, and an audience near the sweet spot 440 would have the best experience of sound effect. Media content such as a film encoding into those formats thus encoded the audio to be produced from those speakers 410 and woofer 420 at precise timings. Taking advantage of the preconfigured reference implementation of a surrounding audio format and directional sensitivity of microphone array, a virtual microphone array 430 may be configured to imitate the receiving of the sound from the virtual speakers in the reference implementation and thus calculate the positional data of the speeches by using the directional detection algorithms of microphone array such as the beam-forming algorithms. It should be appreciated that the woofer 420 is also a speaker, and thus the speakers 410 and the woofer 420 may be referred to commonly as speakers. Typically speeches would not be output from the woofer 420, therefore the virtual microphone array 430 may be configured to imitate the receiving of the sound from only the virtual speakers 410. Alternatively, the virtual microphone array 430 may also be configured to imitate the receiving of the sound from all the speakers including the virtual speakers 410 and virtual woofer 420.

For a specific format of the audio, such as Dolby 5.1, Dolby 7.1, Dolby Atmos 5.1.4, Dolby Atmos 7.1.4, DTS Coherent Acoustics (DCA) w/5.1, etc, the corresponding reference speaker placement location is known. A location for each virtual microphone of a virtual microphone array 430 may be pre-determined at or near the sweet spot 440. The virtual microphone array shown in FIG. 4 include four microphones, it should be appreciated that there may be more or less microphones. After the location of each of the virtual speakers and each of virtual microphones is determined, the parameters of latency, reflection and so on of the each virtual speaker's output to arrive at each virtual microphone may be predetermined. A single transformation or filter may thus be predetermined for each path from a virtual speaker to a virtual microphone, based on the parameters of latency, reflection, and so on. Then the signal received by a single virtual microphone from a single virtual speaker may be determined by transforming the output audio signal of this virtual speaker using the predetermined filter for the path between the virtual microphone and the virtual speaker. Then the signals received by any single virtual microphone from the multiple virtual speakers may be mixed to form the resulting sound signal received by the virtual microphone. Finally, the resulting sound signals received by the multiple virtual microphones may be processed using the beamforming algorithms to separate out cleaner speeches from background sound. In implementations, the beamforming algorithms may use provided positional data to improve detection of the speeches, and/or determine a positional data as part of the beamforming algorithm (e.g., using adaptive beamforming). In an implementation, the determined or provided positional data may be retained in the metadata in order to be used in regenerating the sound track. In implementations, a prior positional data may be provided as input to a later beam-forming algorithm, based on the premise that a position of an actor will be at or near the previous location. It should be appreciated that although it is described with reference to the voice positioning module 380, the process of separating out clean speeches from background sound based on the predefined reference speaker configuration and the virtue microphone array may be utilized in the speech separation module 3204.

At speech grouping module 3206, the speeches may be grouped according to different speakers or their voices.

In an implementation, actor information which may be obtained from the metadata may be used to facilitate the grouping of speeches. Voice characteristic data of some actors such as famous actors may be stored in a database. If there is a matching between the actor information and the database, an actor's voice characteristic data may be obtained from the database. And speeches matching the actor's voice characteristic may be classified to be associated with the actor or his/her voice. For example, a grouped speech may be given a speaker ID or voice ID.

In an implementation, a voice clustering process may be used to clustering speeches to be associated with different speakers or their voices even in the case of lacking existing knowledge of the speaker's voice characteristics. The voice clustering process may utilize various parameters such as spectrum, pitch, tone and so on. Various voice clustering techniques may be used to perform the voice clustering.

In various implementations, assistant information may be utilized to enhance the voice grouping. The detected speeches may be grouped to be associated with respective voices based on at least one of: voice analysis of the speeches, tracking of audio position of the speeches, detection of visual scene transition, visual recognition of speaker, subtitles, and closed captions.

In an implementation, text information may be utilized to enhance the voice grouping. In some cases, the subtitles or closed captions (CC) contained in the metadata may indicate the identification of a speaker who is speaking out a line, this identification of a speaker associated with a line may be obtained at the text processing module 360. The speech grouping module 3206 may identify the speaker associated with a detected speech based on this identification information, or may give a high probability used to identify the speaker.

The text formats of subtitles or closed captions may be different for on-screen sound and off-screen sound. For example, when the speaker is on-screen, the subtitles may be normal font, and when the speaker is off-screen, subtitles may be italicized. Within a single scene, it's most likely that an actor will speak on-screen or off-screen, rarely speak while transitioning from off-screen to on-screen. Thus, a transition from a first text format such as italics to a second text format such as non-italics or vice versa may indicate high probability of a speaker change, even where an identification of this change of speaker is not present in the subtitles. The text process module 360 may detect the transition between text formats, and the speech grouping module 3206 may utilize the detected transition to give an accurate estimate for speaker changing, enhancing the speech grouping.

In an implementation, visual information may be utilized to enhance the voice grouping. For example, at the visual processing module 340, a scene change may be detected from the visual signal. The speech grouping module 3206 may generally determine a higher probability of a speaker change based on the detected scene change. As another example, at the visual processing module 340, the visual signal may be process by utilizing face recognition process. The recognized face may accurately identify a speaker and the identified speaker ID may be utilized by the speech grouping module 3206 to enhance the voice grouping. On the other hand, the position of the recognized speaker on the screen may also provide assistant information for the voice position tracking module 380 to improve the voice position tracking.

In an implementation, the above mentioned voice position data may be utilized to enhance the voice grouping. When the positional data is smoothly changing or staying static, this indicates a higher probability that the person speaking is the same. Similarly, when the positional data jumps or suddenly changes, this tends to indicate a high probability that the person speaking changed, especially when it's a physically-impossible transition. The speech grouping module 3206 may utilize the above information obtained from the positional data to give an appropriate probability of a speaker change.

The above mentioned kinds of assistant information may be jointly utilized by the speech grouping module 3206 to determine the probability of a speaker change.

In an implementation, the detected scene change and text format change may be jointly utilized by the speech grouping module 3206 to determine a probability of a speaker change. The text format change without the scene change may indicate a higher probability of a speaker change, while the text format change with the scene change concurrently or within a reasonable time period may not indicate a higher probability of a speaker change and thus the speech grouping module 3206 may for example keep the probability of a speaker change remained.

In an implementation, the detected scene change and voice position jump may be jointly utilized by the speech grouping module 3206 to determine a probability of a speaker change. The voice position jump without scene change may indicate a higher probability of a speaker change, while the voice position jump with the scene change concurrently or within a reasonable time period may not indicate a higher probability of a speaker change.

At speech to text (STT) module 3208, the speeches may be converted into texts. The STT module may also be referred as a speech recognition (SR) module, which may recognize the speeches into texts. A STT model may be used to convert a speech into text. For example, the STT model may use a tree of probabilities of words to translate the speech into text. Various SR techniques may be used at the STT module 3208. In addition, characteristics of the speech such as stress, tonality, speed, volume, inflection and so on may be detected from the speech at the STT module.

In an implementation, text information such as a closed caption, a subtitle, a script, a transcript and a lyric obtained from the metadata may be used by the STT module 3208 to enhance the accuracy of STT conversion. For example, a STT model may include a sound model which converts the sound to a pronouncing sequence and a language model which converts the pronouncing sequence to the text. The closed caption is usually not identical to the speeches of the audio. The STT module 3208 may use the closed caption as an initial version of text and use the speeches to verify and correct the text. Specifically, the STT module 3208 may convert a line of the closed caption to a first pronouncing sequence, and convert the corresponding speech to a second pronouncing sequence. If the matching of the two pronouncing sequences are perfect or satisfied, this indicates that this line is identical to the speech and may be used as the STT result. If the two pronouncing sequences are partially matched, the matched part of the line may be retained and the unmatched part of the line may be rectified by performing the SR to the corresponding speech. In this way an enhanced STT result may be achieved.

As another example, the STT module 3208 may utilize the closed caption to enhance the STT conversion. For two or more words which may have similar sounding phonemes, the probabilities of the candidate words may be near equal. The STT module 3208 may determine which of the candidate words has similar meaning to the closed caption, and may give the word a higher weight to its probability. In this way, the correct word is more likely to be determined as the STT result. In addition to the closed caption, the subtitle, script, transcript and lyric may also be utilized to enhance the STT conversion.

At a machine translation (MT) module 3210, the texts generated by STT module 3208 in a first language may be translated automatically to texts in a second language.

The MT module 3210 may utilize at least one of the characteristics of the speeches, the genre information of the media content and the scene knowledge to improve the translation.

The genre information may be combined to understand scene in which audio occurred. The stress and tonality may be utilized in combination with text entity (i.e., meaning) analysis and scene knowledge to improve the translation. As an example, translation to Japanese may depend on the relative social stratum of the speaker and audience. English may not have this notion. If the stress and tonality, in combination with entity analysis of an English speeches can infer the speaker is angry but speaking softly so as not to be heard, it may imply derogatory remarks, which may translate differently than literal translation. If the stress and tonality, in combination with entity analysis of an English speeches can infer a first speaker is haughty and speaking to a second speaker who speaks humbly, Japanese language translation may assign higher social stratum to the speaker, and/or lower social stratum to the humble speaker, resulting in different words being selected for the translation.

At a voice print creating module 3212, a voice print model may be created for a voice based on the speeches of the voice. It should be appreciated that, although the STT module 3208 is illustrated in FIG. 3 as a separate module from the voice print creating module 3212, the voice print creating module 3212 may include its own STT module and do not need to receive the output from the STT module 3208. And the STT module 3208, the translation module 3210 and the TTS module 3214 may constitute a speech to speech translation module.

At the voice print creating module 3212, at least part of the extracted and grouped speeches of a speaker may be used as training data to train a voice print model of the speaker. Various voice print creating models or processes may be utilized at the module 3212 to create the voice print model. As an example, a seed voice print model, which is trained based on a huge amount of training data, may be used with the speeches of the speaker to train the voice print model of the speaker. By utilizing the seed voice print model, only a limited number of sample speeches or sentences are needed to train the voice print model of the speaker. The voice print model of the speaker may include phonemes that are in line with the speaker's voice, and thus may represent the speaker's voice irrespective of language. As another example, the voice print creating module 3212 may utilize automated speech-to-text process to assign probabilistic phonemes based on the speeches so as to generate the voice print model.

The voice print creation may be enhanced if the STT result may be improved. Since the STT is enhanced by utilizing at least one of the closed caption, the subtitle, script, transcript, lyric and so on as mentioned above with reference to STT module 3208, the voice print creation may be enhanced accordingly.

At a text to speech (TTS) module 3214, the TTS conversion may be perform on the translated text in the second language based on the voice print model output by the voice print creating module 3212 to generate a speech in the second language and in the original actor's voice. In addition, the characteristics such as stress, tonality, speed, volume, inflection and so on may be applied during the TTS to generate the speech in the second language. As mentioned above, the characteristics such as stress, tonality, speed, volume, inflection and so on may be detected from the speech at the STT process or may be obtained from the metadata.

At a combining module 3216, the replacement speeches in the second language may be used to replace the corresponding speeches in the first language to obtain the dubbed audio. Referring back to the speech separation module 3204, at which the speeches are muted or suppressed in the audio, and at the combining module 3216, the replacement speeches are mixed with the background sound to generate the dubbed audio. Several implementations for muting the speeches have been described above with reference to the speech separation module 3204. In an implementation, the texts output at the STT module 3208 may be converted to speech through TTS based on the created voice print model and optionally the above mentioned positional data of the audio to regenerate the speeches in the first language. The regenerated speeches may be utilized to mute or suppress the speeches in the audio. For example, the regenerated speeches may be used to get a noise profile as mentioned above, and the noise profile may be applied to the audio track to eliminate the speeches and obtain the background sound with a better quality.

In the illustrated embodiment of FIG. 3, the voice print creating module 3212 may generate a voice print model for a voice or an actor based on the actor's own voice. As mentioned above with reference to FIG. 1, the voice print model may be obtained in different ways when different dubbing functions are chosen. In an implementation, predefined speeches of a user may be sampled by using a speech capturing device such as a microphone or microphone array, a voice print model may be created based on the sampled speeches of the user. The voice print model of the user may include phonemes that are in line with the user's voice, and thus may represent the user's voice irrespective of language.

In an implementation, the voice print model may be chosen from a predefined set of voice print models. For example, a voice print model of a user or the user's favorite actor may be stored in the database as shown in FIG. 1A, and may be chosen by the user from the database for the above mentioned customized dubbing.

In an implementation, a voice print model may be automatically chosen from a database based on at least one of characteristic of the extracted speeches of a voice, speaker information of the media content, genre information of the media content, content of at least part of the extracted speeches of the voice. For example, the characteristic of the extracted speeches may be utilized to select a most matching voice print model from the database. A simple example may be that a male voice print model within a range of voice tone (e.g. low, bass) may be chosen if the detected speech was in the same range. As another example, the actor information, which may be included in the metadata, may be used to select an exact voice print model from the database if available. In this example, voice print models of famous actors may be provided in the database as shown in FIG. 1B. As another example, the genre information, which may be included in the metadata, may be utilized to choose a voice print model from the database. If the media content is a sport video, a sport announcer's voice print model may be chosen from the database. If the media content is a funny video clip, a comedian's voice print model may be chosen from the database. As another example, content of the extracted speeches may be utilized to choose a voice print model from the database. The content of a speech may be used to select a voice print model that is known to have said the lines or the content. For example, if the line was "The force will be with you . . . always", and the voice print model database includes voice print models of actors such as Arnold Schwarzenegger, Alec Guinness, and Harrison Ford, then the text of the speech may be used to determine that a first actor such as Alec Guinness actually spoke that line in a very popular movie, therefore the first actor's voice print model being a very good choice, a second actor such as Harrison Ford said similar lines in a very popular movie, therefore the second actor's voice print model being a good choice, but no record of a third actor such as Arnold saying that line exists, therefore the third actor's voice print model being a poor choice. It should be appreciated that the above mentioned factors may be utilized individually or any combination of the factors may be utilized to determine the choice of the voice print model from the database.

In the illustrated embodiment of FIG. 3, the MT module 3210 is used to perform the automatic translation from a first language to second language. As mentioned above with reference to FIG. 1, the translation is not always necessary especially in the case of user customized dubbing. In some implementation, the MT module 3210 may be omitted. And in some implementation, the translation at the MT module 3210 may be performed or may be bypassed based on different dubbing requirements, which may be configured by the user as illustrated in FIG. 1.

Figure 5:
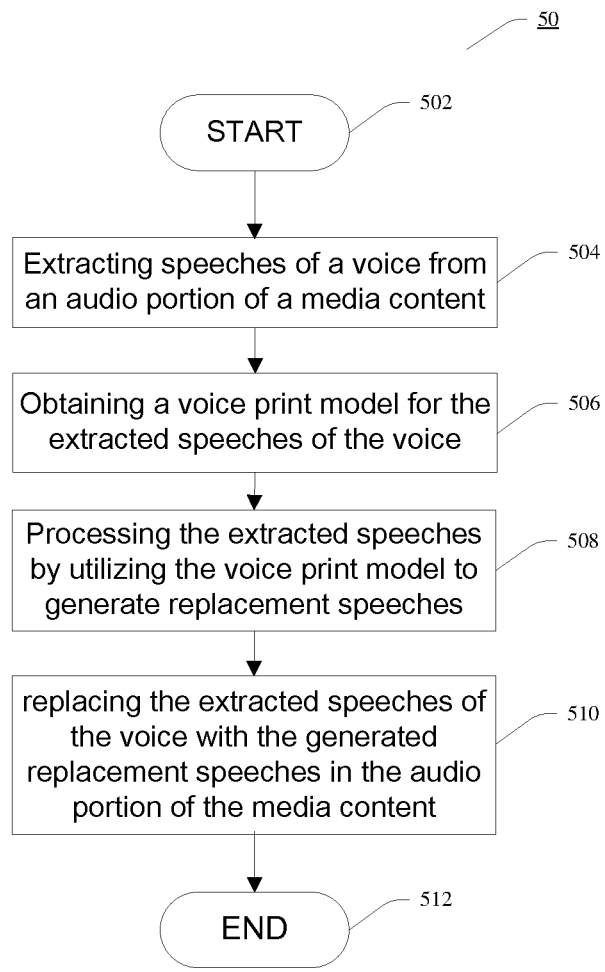
FIG. 5 illustrates a flowchart of a process for perform automatic dubbing for a media content according to an embodiment of the subject matter.

FIG. 5 illustrates a process for perform automatic dubbing for a media content according to an embodiment of the subject matter.

Starting from block 502, at block 504, speeches of a voice may be extracted from an audio portion of a media content. At block 506, a voice print model may be obtained to be used for the extracted speeches of the voice. At block 508, the extracted speeches may be processed by utilizing the obtained voice print model to generate replacement speeches. At block 510, the extracted speeches of the voice may be replaced with the generated replacement speeches in the audio portion of the media content, thereby automatically generating the dubbed audio for the media content. It should be appreciated that the automatic dubbing process may be performed in real time while the media content is being played. And the automatic dubbing process may also be used at e.g. the content provider to perform dubbing for the numerous amount of media content in an efficient way.

The voice print model may be obtained in different ways. In an embodiment, speeches of a user may be sampled by using a speech capturing device and the voice print model may be created based on the sampled speeches of the user. In another embodiment, the voice print model may be chosen from a predefined set of voice print models. The voice print model may be chosen from the predefined set of voice prints by a user. And the voice print model may be chosen from the predefined set of voice prints based on at least one of characteristic of the voice, speaker information of the media content, genre information of the media content, content of at least part of the extracted speeches of the voice. In another embodiment, the voice print model may be created based on at least part of the extracted speeches of the voice. In order to enhance the creation of the voice print model, the creation of the voice print model for the voice may be based further on at least one of a closed caption, a subtitle, a script, a transcript, and a lyric of the media content, in addition to the extracted speeches of the voice.

In an embodiment, in the processing of the extracted speeches, the extracted speeches of the voice in a first language may be translated to the replacement speeches in a second language by utilizing the voice print model. The translated replacement speeches may be generated by further utilizing characteristics of the extracted speeches of the voice, where the characteristics includes at least one of a stress, a tonality, a speed, a volume and an inflection of the speeches, which may be contained in the metadata or may be detected from the speeches.

The translating from the speeches in the first language to the replacement speeches in the second language may be performed by speech-to-text conversion, text-to-text translation and text-to-speech conversion. The speech-to-text conversion may be performed for the extracted speeches of a voice based on at least one of a closed caption, a subtitle, a script, a transcript and a lyric of the media content. The text-to-text translation for the converted text from the first language to the second language may be performed based on at least one of the characteristics of the speeches, a genre information of the media content, a scene knowledge. The text-to-speech conversion for the translated text may be performed based on the voice print model and the characteristics of the extracted speeches.

In an embodiment, in the extraction of the speeches, the speeches may be detected from the audio portion of the media content based on a plurality of audio versions in different languages. The speeches may also be detected from the audio portion of the media content based on a predefined reference configuration of speaker locations and a virtual microphone array. The speeches may also be detected from the audio portion of the media content based on a plurality of audio objects and positional data obtained from the audio portion. The positional data may be calculated in the voice position tracking module. The positional data of speeches in the audio portion may be determined based on predefined speaker locations for the audio portion and a virtual microphone array. The positional data may be encoded in the audio stream for some audio formats, thereby the positional data may be obtained by decoding the audio stream. In the extraction of the speeches, the speeches may be grouped to be associated with the voice based on at least one of voice characteristic of the speeches, audio positional data, detection of visual scene transition, visual recognition of speaker, subtitles, and closed captions.

In an embodiment, the replacing of the speeches may be performed by muting the speeches of the voice from the audio portion and adding the replacement speeches in place of the muted speeches in the audio portion. In other words, the replacement speeches may be mixed with the audio having the original speeches muted. The speeches may be muted by utilizing the extracted speeches from the audio portion, for example, the extracted speeches may be suppressed from the audio. The speeches may be muted by utilizing a plurality of audio objects obtained from the audio portion based on positional data, for example, the speeches may be suppressed by subtracting an audio channel from another audio channel which have center positioned speeches. Speeches for a voice may be regenerated based on the voice print model of the voice and positional data, and the speeches may be muted based on the regenerated speeches.

Figure 6:
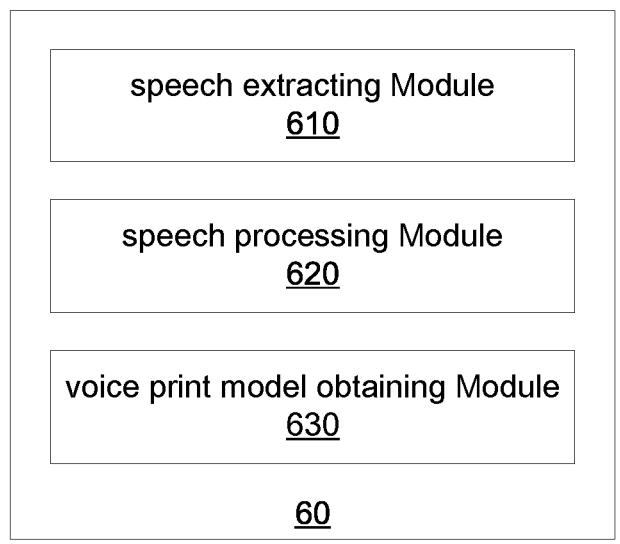
FIG. 6 illustrates a block diagram of an apparatus for performing automatic dubbing for a media content according to an embodiment of the subject matter.

FIG. 6 illustrates an apparatus 60 for performing automatic dubbing for a media content according to an embodiment of the subject matter. The apparatus 60 may include a speech extracting module 610, a speech processing module 620 and a voice print model obtaining module 630.

The speech extracting module 610 may be configured to extract speeches of a voice from an audio portion of a media content. The voice print model obtaining module 630 may be configured to obtain a voice print model for the extracted speeches of the voice. The speech processing module 620 may be configured to process the extracted speeches by utilizing the voice print model to generate replacement speeches, and replace the extracted speeches of the voice with the generated replacement speeches in the audio portion of the media content.

In an exemplary implementation, the speech extracting module 610 may include the speech separation module 3204 and the speech grouping module 3206 as shown in FIG. 3, the speech processing module 620 may include the STT module 3208, the TTS module 3214, combining module 3216 and may optionally include the MT module 3210, and the voice print model obtaining model 630 may include the voice print creating module 3212. It should be appreciated that modules and corresponding functions described with reference to FIGS. 2, 3 and 6 are for sake of illustration rather than limitation, a specific function may be implemented in different modules, for example, the muting of speeches may be performed in the speech separation module 3204 and may also be performed in the combining module in some implementation.

It should be appreciated that the speech extracting module 610, the speech processing module 620 and the voice print model obtaining model 630 may perform the respective operations or functions as described above with reference to FIGS. 2 to 5 in various embodiments of the subject matter.

The respective modules as illustrated in FIGS. 2, 3 and 6 may be implemented in various forms of hardware, software or combinations thereof. In an embodiment, the modules may be implemented separately or as a whole by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. In another embodiment, the modules may be implemented by one or more software modules, which may be executed by a general central processing unit (CPU), a graphic processing unit (GPU), a Digital Signal Processor (DSP), etc.

Figure 7:
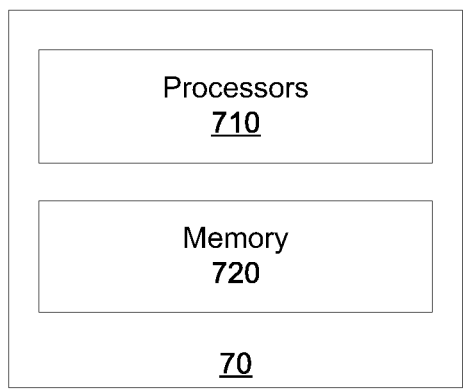
FIG. 7 illustrates a block diagram of a computer system for performing automatic dubbing for a media content according to an embodiment of the subject matter.

FIG. 7 illustrates a computer system 70 for performing automatic dubbing according to an embodiment of the subject matter. According to one embodiment, the computer system 70 may include one or more processors 710 that execute one or more computer readable instructions (i.e. the elements described above which are implemented in the form of the software) stored or encoded in computer readable storage medium (i.e. memory) 720.

In an embodiment, the computer-executable instructions stored in the memory 720, when executed, may cause the one or more processors 710 to: extract speeches of a voice from an audio portion of a media content; obtain a voice print model for the extracted speeches of the voice; process the extracted speeches by utilizing the voice print model to generate replacement speeches; and replace the extracted speeches of the voice with the generated replacement speeches in the audio portion of the media content.

It should be appreciated that the computer-executable instructions stored in the memory 720, when executed, may cause the one or more processors 710 to perform the respective operations or functions as described above with reference to FIGS. 1 to 6 in various embodiments of the subject matter.

According to an embodiment, a program product such as a machine-readable medium is provided. The machine-readable medium may have instructions (i.e. the elements described above which are implemented in the form of the software) thereon which, when executed by a machine, cause the machine to perform the operations or functions as described above with reference to FIGS. 1 to 6 in various embodiments of the subject matter.

It should be noted that the above-mentioned solutions illustrate rather than limit the subject matter and that those skilled in the art would be able to design alternative solutions without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the system claims enumerating several units, several of these units can be embodied by one and the same item of software and/or hardware. The usage of the words first, second and third, et cetera, does not indicate any ordering. These words are to be interpreted as names.

The invention claimed is:

1. An automatic dubbing method, comprising:
    extracting speeches of a first voice from an audio portion of a media content;
    receiving an audio input of a second voice of a user of a user device;
    extracting speeches of the second voice from the audio input including a set of phonemes of the second voice;
    generating a voice print model for the extracted speeches of the second voice;
    receiving a selection of the media content for playback on the user device by the user of the user device;
    responsive to receiving the selection of the media content for playback and during playback of the media content on the user device;
        processing the extracted speeches of the first voice by utilizing the voice print model to generate replacement speeches, the replacement speeches generated using the set of phonemes of the second voice;
        replacing the extracted speeches of the first voice with the generated replacement speeches in the audio portion of the media content; and
        outputting the audio portion with the generated replacement speeches for playing on the user device.

2. The method of claim 1, wherein the generating the voice print model further comprises:
    sampling speeches of the user by using a speech capturing device and creating the voice print model based on the sampled speeches of the user.

3. The method of claim 1, wherein the generating the voice print model further comprises:
    creating the voice print model for the voice based further on at least one of a closed caption, a subtitle, a script, a transcript, and a lyric of the media content.

4. The method of claim 1, further comprises:
    determining positional data of speeches in the audio portion based on predefined speaker locations for the audio portion and a virtual microphone array.

5. The method of claim 1, wherein the extracting speeches of the first voice comprises:
    detecting the speeches from the audio portion of the media content based on a plurality of audio versions in different languages; or
    detecting the speeches from the audio portion of the media content based on a plurality of audio channels and positional data obtained from the audio portion; or
    detecting the speeches from the audio portion of the media content based on predefined speaker locations and a virtual microphone array.

6. The method of claim 1, wherein the processing the extracted speeches further comprises:
    translating the extracted speeches of the first voice in a first language to the replacement speeches in a second language by utilizing the voice print model.

7. The method of claim 6, wherein the translating further comprises:
    generating the translated replacement speeches by further utilizing characteristics of the extracted speeches of the first voice, wherein the characteristics includes at least one of a stress, a tonality, a speed, a volume and an inflection of the speeches.

8. The method of claim 7, wherein the translating further comprises:
performing speech-to-text conversion for the extracted speeches of the first voice based on at least one of a closed caption, a subtitle, a script, a transcript and a lyric of the media content; and/or
performing text-to-text translation for text converted from the first language to the second language based on at least one of the characteristics of the speeches, a genre information of the media content, a scene knowledge; and
generating the translated replacement speeches for the first voice by performing text-to-speech conversion for the translated text based on the voice print model and the characteristics of the extracted speeches.

9. The method of claim 1, wherein the extracting speeches of the first voice comprises:
grouping the speeches to be associated with the first voice based on at least one of:
voice characteristic of the speeches, audio positional data, detection of visual scene transition, visual recognition of speaker, subtitles, and closed captions.

10. The method of claim 1, wherein the replacing comprises:
muting the speeches of the first voice from the audio portion; and
adding the replacement speeches in place of the muted speeches in the audio portion.

11. The method of claim 10, wherein the muting comprises:
muting the speeches of the first voice by utilizing the extracted speeches from the audio portion; or
muting the speeches of the voice by utilizing a plurality of audio channels obtained from the audio portion based on positional data; or
regenerating speeches for the voice based on the voice print model of the voice and positional data, and muting the speeches based on the regenerated speeches.

12. An automatic dubbing apparatus, comprising:
a speech extracting module configured to extract speeches of a first voice from an audio portion of a media content, receive an audio input of a second voice of a user of a user device and configured to extract speeches of the second voice from the audio input including a set of phonemes of the second voice;
a voice print model obtaining module configured to generate a voice print model for the extracted speeches of the second voice; and
a speech processing module configured to, responsive to receiving a selection of the media content for playback on the user device and during playback of the media content on the user device:
process the extracted speeches of the first voice by utilizing the voice print model to generate replacement speeches, the replacement speeches generated using the set of phonemes of the second voice;
replace the extracted speeches of the first voice with the generated replacement speeches of the second voice in the audio portion of the media content; and
output the audio portion with the generated replacement speeches for playing on the user device.

13. The apparatus of claim 12, wherein the speech extracting module is further configured to:
detect the speeches from the audio portion of the media content based on a plurality of audio versions in different languages; or
detect the speeches from the audio portion of the media content based on a plurality of audio channels and positional data obtained from the audio portion; or
detect the speeches from the audio portion of the media content based on predefined speaker locations and a virtual microphone array.

14. The apparatus of claim 12, wherein the speech extracting module is further configured to:
group the speeches to be associated with the first voice based on at least one of: voice characteristic of the speeches, audio positional data, detection of visual scene transition, visual recognition of speaker, subtitles, and closed captions.

15. The apparatus of claim 12, wherein the voice print model obtaining module is further configured to:
create the voice print model based on speeches of the user, which are sampled by using a speech capturing device.

16. The apparatus of claim 15, wherein the voice print model obtaining module is further configured to:
create the voice print model for the first voice based on the extracted speeches of the first voice and at least one of a closed caption, a subtitle, a script, a transcript, and a lyric of the media content.

17. The apparatus of one of claim 12, wherein the speech processing module is further configured to:
translate the extracted speeches of the first voice in a first language to the replacement speeches in a second language by utilizing the voice print model.

18. The apparatus of claim 17, wherein the speech processing module is further configured to:
generate the translated replacement speeches by further utilizing characteristics of the extracted speeches of the first voice, wherein the characteristics includes at least one of a stress, a tonality, a speed, a volume and an inflection of the speeches.

19. A computer system, comprising:
one or more processors; and
a memory storing computer-executable instructions that, when executed, cause the one or more processors to:
extract speeches of a first voice from an audio portion of a media content;
receive an audio input of a second voice of a user of a user device;
extract speeches of the second voice from the audio input including a set of phonemes of the second voice;
generate a voice print model for the extracted speeches of the second voice;
receiving a selection of the media content for playback on the user device by the user of the user device;
responsive to receiving the selection of the media content for playback and while the media content is being played on the user device, process the extracted speeches of the first voice by utilizing the voice print model to generate replacement speeches, the replacement speeches generated using the set of phonemes of the second voice;
replace the extracted speeches of the first voice with the generated replacement speeches in the audio portion of the media content; and
output the audio portion with the generated replacement speeches.

20. The computer system of claim 19, including instructions that, when executed, cause the one or more processors to create the voice print model based on speeches of the user.

* * * * *